Patented Oct. 4, 1949

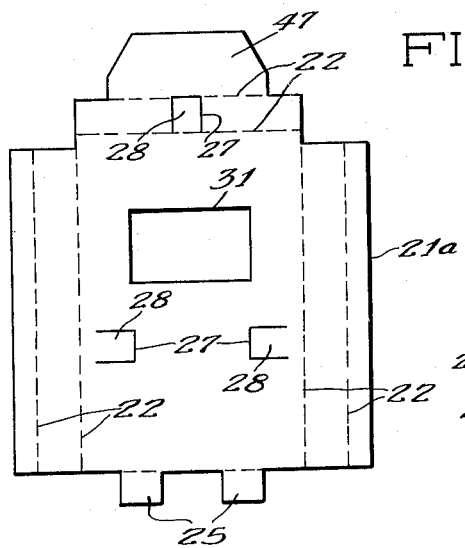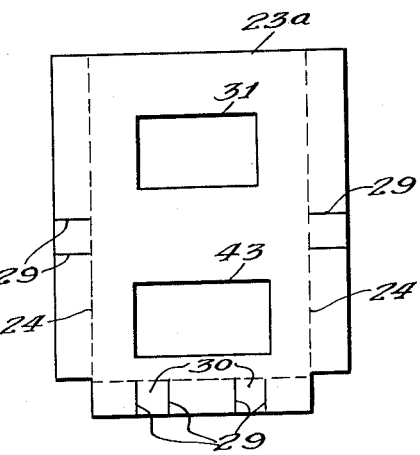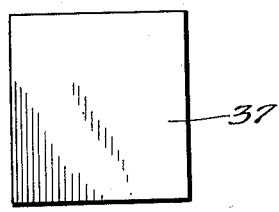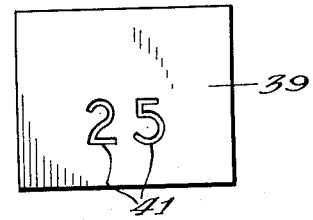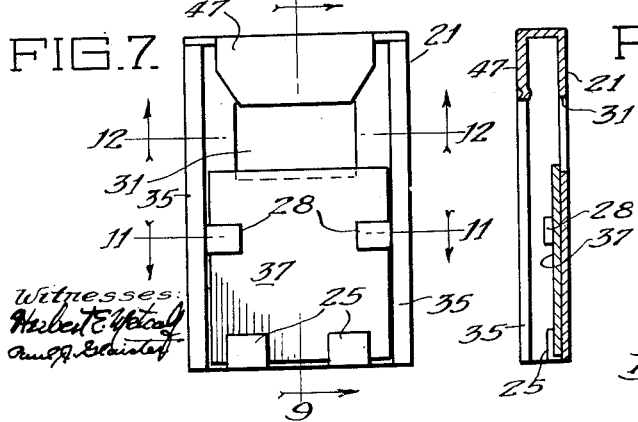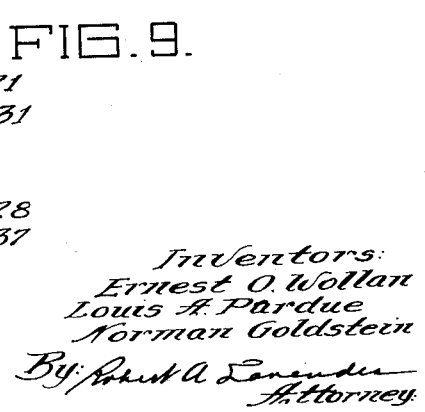

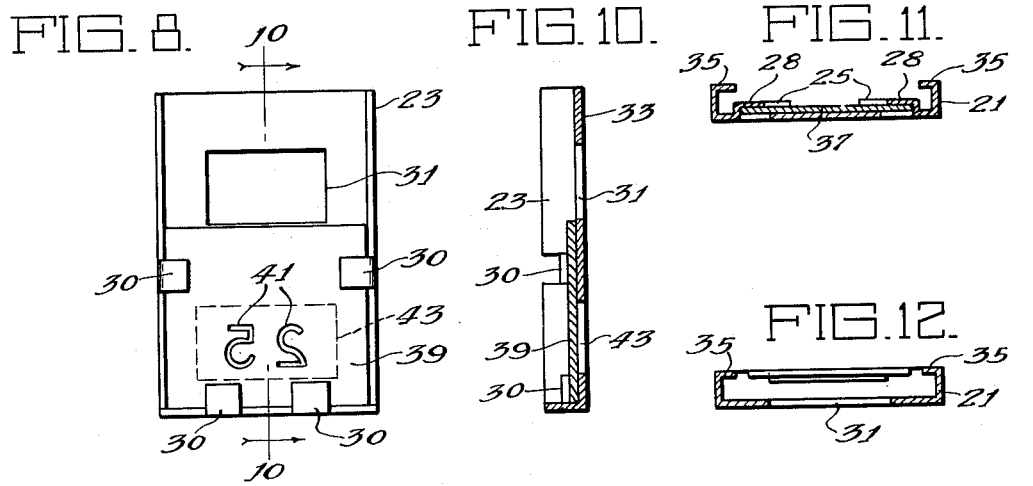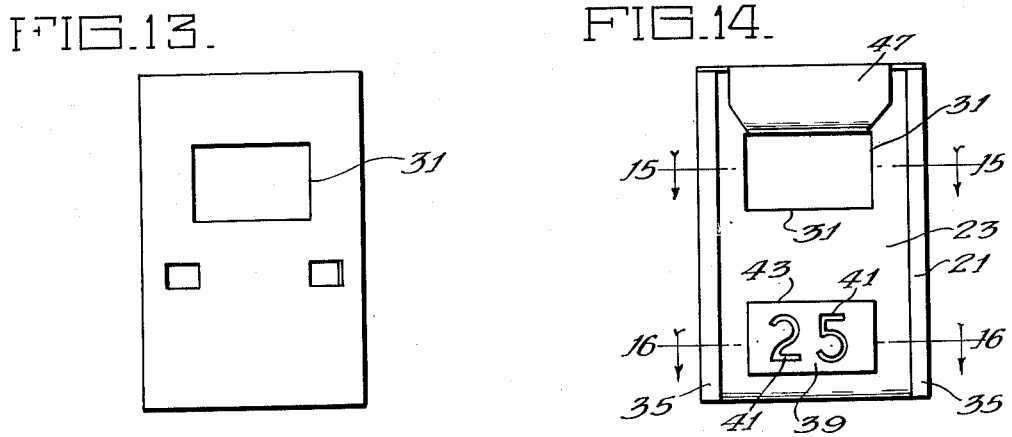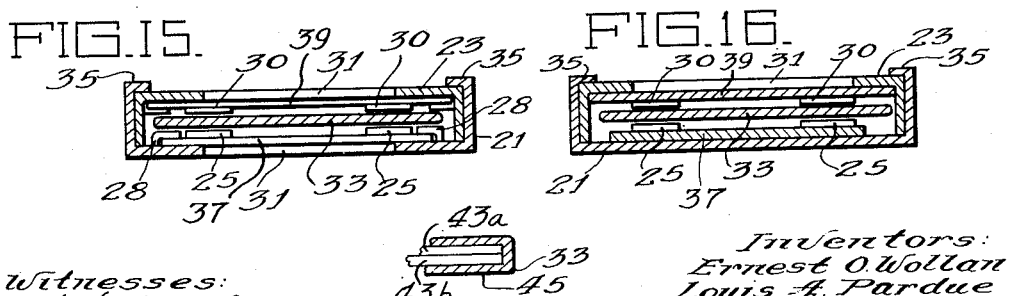

2,483,991

UNITED STATES PATENT OFFICE 2,483,991

RADIATION EXPOSURE METER

Ernest O. Wollan and Louis A. Pardue, Oak Ridge, Tenn., and Norman Goldstein, Chicago, Ill., assignors to the United States of America as represented by the United States Atomic Energy Commission Application March 3, 1945, Serial No. 580,785

20 Claims. (Cl. 250—83)

Our invention relates to apparatus for measuring radiant energy and particularly to apparatus for measuring and metering gamma and other radiations inherently dangerous to living tissue.

In the carrying out of various chemical and other procedures involving radioactive material, the operating personnel is often continuously subjected to various types of radiant energy emanating from such materials. While short exposures to these emanations may not be particularly dangerous, it is a well established fact that the physiological effects of certain radiations are cumulative, and exposure to even relatively small amounts of low energy or "soft" radiation if continued over a sufficient period of time may be very serious. Hence, in order to adequately safeguard the health of persons working with, or in the vicinity of, radioactive materials, it is very important that means be available whereby the amount and also the intensity of exposure to such radiations can be continuously determinable.

While the physiological danger to living tissue is dependent to some extent upon the intensity or energy level of quantum radiation, the amount of damage to living tissue produced by quantum radiation of both gamma and X-ray types is fairly accurately indicated by measuring and integrating the exposure over a given period of time in roentgen units. For example, the ordinary healthy adult can safely receive an exposure of 100 milli-roentgens per day, or about 3 roentgens per month.

However, the provision of a satisfactory radiation meter for use by individuals working with radioactive materials is considerably more complicated than the mere measurement of exposure in roentgens. Specifically, a satisfactory instrument should have a response characteristic which is substantially linear and independent of the quantum energy of the radiation within the danger zone. Second, the range of the meter should be sufficiently low to permit accurate determination of permissible exposures, yet at the same time, the instrument should be capable of measuring and recording large exposures in the event that the worker should inadvertently be exposed thereto. This requirement means, in effect, that the meter should be capable of indicating cumulative exposures within a range of from less than .1 roentgen to about 20 roentgens. Third, it is a most important requirement that the instrument should not be responsive to agents other than the particular radiations which are to be measured. Fourth, the meter should be small in size and sufficiently light that it can be carried on the person without undue discomfort. And fifth, it is highly desirable that the meter should be capable of indicating at least qualitatively the presence of radiations other than the quantum type, there being a particular need for at least qualitative indication of beta radiation, since this type of radiation is also of considerable potential danger to living tissue.

The principal object of the present invention is to provide a simple radiation meter which will fully satisfy all of the above stated requirements. Another object of our invention is to provide an instrument in accordance with the principal object which is capable of being read and evaluated and kept in operating condition by relatively unskilled personnel, thereby adapting the instrument for use in large organizations without unreasonable expense or labor.

As will hereinafter appear the objects of the invention are accomplished by the provision of a radiation meter which comprises a film holder or cassette of special design and which employs multiple X-ray films as the sensitive element thereof. The details of the invention and the various novel features and constructional arrangements embodied therein will be made more apparent by reference to the following description and the accompanying drawings of one illustrative embodiment thereof. In the drawings, Figs. 1 and 2 are outline views of the two sheet metal punchings which are shaped to form the two elements of the film holder or cassette;

Figs. 3 through 6 are plan and elevational views of two sheet metal filter elements forming a part of the apparatus;

Figs. 7 and 8 are plan views of the two elements of the assembled film holder and filter units;

Figs. 9, 10, 11, and 12 are sectional views taken on the lines 9—9, 10—10, 11—11, and 12—12, respectively, of Figs. 7 and 8;

Figs. 13 and 14 are, respectively, top and bottom plan views of the complete instrument in operating condition;

Figs. 15 and 16 are enlarged sectional views taken on the lines 15—15 and 16—16, respectively, of Fig. 14; and Fig. 17 is an enlarged fragmentary sectional view of the film unit used in the complete instrument.

The film holder or cassette of the particular embodiment of the invention illustrated in the drawings is of two part construction; it is adapted to be readily disassembled in order to facilitate the insertion and removal of the sensitive film unit; and the dimensions of the device are such that it may be worn as a badge or otherwise conveniently carried by the user. Both the inner and outer elements of the holder are made from thin, sheet metal punchings, preferably of aluminum or steel, shaped so as to provide two interengaging, channel shaped, box-like structures, which are rectangular in outline, as illustrated particularly at 21 and 23 in Figs. 7 to 12.

The outline of the punching for the outer element 21 of the film holder is illustrated at 21a in Fig. 1. The punching 21a is folded into channel shape along the dotted lines 22, and it is provided with two integral tabs 25 at the lower end thereof and with three U-shaped cuts 27 which provide additional tabs 28 in the formed element. The outline of the punching 23a for the inner element 23 is illustrated in Fig. 2. This punching is folded into channel shape along the dotted lines 24 and is provided with four sets of parallel cuts 29 used to define tabs 30 (see Figs. 2, 8 and 10). Rectangular openings 31 are provided in each of the punchings 21a and 23a, and these openings are adapted to align in the assembled device to provide windows through which all radiations in the vicinity of the instrument may be freely admitted to the film unit 33.

The proportions of the inner and outer elements 21 and 23 of the holder are such that the inner element 23 may be slid beneath the bent over portions 35 at the two edges of the outer element 21 to define a box-like structure which is rectangular in outline and rectangular in cross-section, as illustrated in the drawings. The inner and outer parts 21 and 23 should engage each other with sufficient friction that the device will hold itself together.

To make possible quantitative measurements of the quantum type exposure in roentgen units, it is necessary that the sensitive element of the meter shall respond almost linearly to gamma and X-ray radiations of dangerous intensity, i. e., quantum radiation having energy levels of from about 50 kilovolts to 200 kilovolts or more. We have discovered that this desired characteristic can be imparted to commercial X-ray film by the use of a filter interposed between the source of the radiation and the film. This filter is of a material which causes the blackening of the film to take place at a substantially uniform level regardless of the quantum energy of the radiation causing such blackening, and it blocks out entirely the very soft and relatively less dangerous radiations. In the absence of such a filter much more intense blackening of X-ray film is produced by low energy quantum radiation than is produced by high energy quantum radiation, and this characteristic has thwarted previous attempts to use such film as a quantitative indicator of quantum radiation. Specifically, it is our discovery that if a sheet of metallic cadmium of about 1 mm. to 2 mm. in thickness or a sheet of metallic silver of similar thickness is interposed between an X-ray film and a source of quantum radiation, substantially uniform blackening of the film results from exposure to equal roentgen units of gamma radiation within the dangerous range, i. e., about 50 to 200 kilovolt radiations. It is believed that other metals might be similarly useful, but cadmium and silver are the only metals we have found entirely suitable.

The instrument of our invention is provided with two of these filter units as illustrated at 37 and 39. Each unit comprises a flat sheet of cadmium or silver held in place against the face of the inner and outer elements 21 and 23 by the tabs 25, 28, and 30 as shown particularly in Figs. 7 through 11. A filter unit is used on both faces of the holder for the reason that the device may be turned so that either the top or the bottom thereof faces the source of radiation during use.

In order to provide a simple, positive means of marking the film, one or both of the filter plates 37 and 39 may be provided with punched out numerals or other marking indicia, as illustrated at 41. The area of the film beneath this cutout section will show increased blackening, or if desired that area may be exposed to X-ray or gamma radiation prior to the issuance of the meter to personnel. It is desirable that a window such as that illustrated at 43 be provided to permit visual inspection of the marking 41 when the instrument is assembled.

It will be seen that the instrument described in the foregoing is provided with three sections or zones. The first of these sections is that provided by the aligned windows 31 in the inner and outer elements 21 and 23 of the holder. The portions of the film unit 33 disposed in alignment with the openings 31 receive all types of radiation and the blackening of the film in this area will be due not only to quantum but also to beta radiation and, if the film is sensitive thereto, to alpha radiation. The section of film unit 33 in the central portion of the instrument is shielded on both sides by the filter plates 37 and 39, and this area of the film receives only quantum radiations within the particular range passed by the filter plates. The density of film blackening in this area is, therefore, an accurate quantitative measurement of the radiation in roentgens which has reached the film unit, and if the instrument is being worn by a worker, it is an accurate quantitative measurement of the exposure of the individual to quantum radiation. The lower section of the film unit, due to the cut-out markings 41 provided in one or both of the filters 37 and 39 is used wholly as an identification region.

In order that the instrument may be sensitive over the rather wide range of exposures desired, that is, .1 roentgen to about 20 roentgens, the film unit 33 is of multiple construction. The outline and dimensions of the film unit 33 are such that it will fit the rectangular space within the assembled holder, as illustrated in Figs. 15 and 16, and the unit comprises two or more sheets 43a and 43b of X-ray sensitive film contained in a suitable light proof wrapping 45, see Fig. 17. The two films 43a and 43b are coextensive and are positioned one on top of the other.

The films 43a and 43b are of differing sensitivity. One of the films should be of relatively high sensitivity, such that maximum blackening of that film will occur at the end of a period of exposure integrating about 3 roentgens. Such a film will permit quantitative readings down to about .03 roentgen. The other film 43a or 43b which is of less sensitivity should reach maximum blackening with an exposure of the order of about 20 roentgens. The minimum measurable blackening with this film for commercially available products is substantially less than the maximum measurable density for the more sensitive film, hence accurate quantitative readings over the complete range can be obtained. It will be apparent that three or even more films of differing sensitivity ranges to quantum energy or to radiant energy of other types can be used in the event that increased range of the instrument is desired.

During the use of the device it is intended that one of the instruments shall be issued to each worker who may be exposed to dangerous radiation. The issuance would normally be at regular time intervals, such as once a week or even once a month. The meter will be carried by the user at all times and to this end it desirably includes a clip element such as is formed by the bent over end portion 47 of the outer holder unit element 21. The meters should be collected and the film developed at regular intervals and a complete record should, of course, be made and kept of the indicated exposures. Simple densitometer measurement of the film blackening and evaluation of that measurement on the basis of known standards are the only measuring operations required. In this manner it is possible to determine immediately when any individual is being exposed to excessive amounts of radiation and to adopt suitable corrective measures. The use of multiple films provides a means whereby normal small exposures may be accurately metered, and at the same time, it permits accurate metering of accidental massive doses. The device also provides at least a qualitative indication of the presence of beta or other radiations. This is of very great value in locating promptly any accidental radiation leakage or any unknown source which if not found might cause serious injury to personnel.

The meter of our invention is above all a simple and highly effective device. It is substantially foolproof and the evaluation of the readings which necessitates nothing more than the simple mechanical operation of a densitometer comparison of film blackening against known standards may be carried out rapidly and reliably by unskilled labor. The features of our invention which are believed to be new are particularly pointed out in the appended claims.

For purposes of illustration a specific embodiment of the invention is disclosed, but it is recognized that many modifications may appear to a person skilled in the art without departing from the intended scope of the invention.

We claim:

1. A radiation meter of the class described comprising a film holder, a film which is sensitive to X-ray and gamma radiation contained in said holder, and filter means arranged to filter the radiations reaching an area of said film, the absorption characteristics of said filter means and the energy response characteristics of said film being so correlated that the response of said film for equal exposures in roentgen units is substantially independent of the quantum energy of the radiation in the energy range which it is desired to meter.

2. A radiation meter of the class described comprising a box-like film holder of such size and weight that it may be carried conveniently on the person of the user, a film which is sensitive to X-ray and gamma radiation contained in said holder, and filter means supported upon said holder so as to be positioned in the path of radiations reaching a particular area of said film, the absorption characteristics of said filter means and the energy response characteristics of said film being so correlated that the response of said film for equal exposures in roentgen units is substantially independent of the quantum energy of the radiations in the energy range which it is desired to meter.

3. A radiation meter of the class described comprising a pair of cooperating members assembled in interfitting relation so as to define the walls of a box-like film holder, a film contained in said holder, and filter means supported upon said holder so as to be positioned in the path of radiations reaching a particular area of said film, the absorption characteristic of said filter means and the energy response characteristics of said film being so correlated that the response of said film for equal exposures in roentgen units is substantially independent of the quantum energy of the radiation in the energy range which it is desired to meter, said meter being of such size and weight that it may be carried conveniently on the person of the user and said cooperating members being readily disassembled to permit removal and replacement of said film.

4. A radiation meter of the class described comprising a pair of cooperating, channel shaped members, generally rectangular in outline and assembled in interfitting relation so as to define the walls of a box-like film holder, a film contained in said holder, and filter means comprising members of sheet metal affixed to said wall defining members so as to shield a particular area of said film, the absorption characteristics of said filter means and the energy response characteristics of said film being so correlated that the response of said film for equal exposures in roentgen units is substantially independent of the quantum energy of the radiation in the energy range which it is desired to meter, said meter being of such size and weight that it may be carried conveniently on the person and said cooperating members being readily disassemblable to permit removal and replacement of said film unit.

5. A radiation meter of the class described comprising a film holder, a film unit contained in said holder, said film unit comprising a plurality of superposed coextensive films which are sensitive to X-ray and gamma radiation but which are of substantially differing sensitivities, and filter means arranged to filter the radiations reaching a predetermined area of said superposed films, the response characteristics of said films and the absorption characteristics of said filter means being so correlated that the response of said film for equal exposures in roentgen units is substantially independent of the quantum energy of the radiation in the energy range which it is desired to meter.

6. A radiation meter of the class described comprising a box-like film holder of such size and weight that it may be carried conveniently on the person of the user, a film unit contained in said holder, said film unit comprising a pair of superposed coextensive films which are sensitive to X-ray and gamma radiation but which are of substantially differing sensitivities, and filter means arranged to filter the radiations reaching a predetermined area of said superposed films, and filter means supported upon said holder so as to be positioned in the path of radiations reaching a particular area of said film, the absorption characteristics of said filter means and the energy response characteristics of said films being so correlated that the response of said films for equal exposures in roentgen units is substantially independent of the quantum energy of the radiation in the energy range which it is desired to meter, and the relative sensitivities of said films being such that maximum blackening of one film is attained with an exposure of the order of 3 roentgens and maximum blackening of the other film is attained with an exposure of the order of 20 roentgens.

7. A radiation meter of the class described comprising a pair of cooperating, channel shaped members assembled in interfitting relation so as to define the walls of a box-like film holder, a film unit contained in said holder, said film unit comprising a pair of superposed, coextensive films which are sensitive to X-ray and gamma radiation but which are of substantially differing sensitivities, and filter means comprising members of sheet metal affixed to said wall defining members so as to shield a particular area of said film, the absorption characteristics of said filter means and the energy response characteristics of said films being so correlated that the response of said film for equal exposures in roentgen units is substantially independent of the quantum energy of the radiation in the energy range which it is desired to meter, said meter being of such size and weight that it may be carried conveniently on the person and said cooperating members being readily disassemblable to permit removal and replacement of said film unit, the relative sensitivities of said film being such that maximum blackening of one film is attained with an exposure of the order of 3 roentgens and maximum blackening of the other film is attained with an exposure of the order of 20 roentgens.

8. A radiation meter as defined in claim 1 wherein the filter means comprises a sheet of metallic cadmium having a thickness of the order of about 1 to 2 millimeters.

9. A radiation meter as defined in claim 1 wherein the filter means comprises a sheet of metallic silver having a thickness of the order of about 1 to 2 millimeters.

10. A radiation meter of the class described comprising a film holder adapted to be worn by personnel exposed to X-ray and gamma and beta type radiations, a film which is sensitive to said types of radiation contained in said holder, said holder having a window therein for free passage of said types of radiation to one portion of said film, and a filter means arranged to filter the radiations reaching another portion of said film, said filter means being substantially impervious to beta type radiation and having absorption characteristics for X-ray and gamma radiation so related to the sensitivity characteristics of said film that the response of said film for equal exposures in roentgen units is substantially independent of the quantum energy of the radiation in the energy range which it is desired to meter.

11. A radiation meter of the class described comprising a film holder adapted to be carried on the person of individuals exposed to X-ray and gamma and beta type radiations, a film which is sensitive to said types of radiation contained in said holder, said holder having a window therein permitting free passage of said types of radiation to one portion of said film, and a filter means arranged to filter the radiations reaching another portion of said film, said filter means being substantially impervious to beta type radiation and having absorption characteristics for X-ray and gamma radiation so related to the sensitivity characteristics of said film that the response of said film for equal exposures in roentgen units is substantially independent of the quantum energy of the radiation in the energy range it is desired to meter, a portion of said filter being pierced with identifying apertures for forming an identification pattern on the underlying portion of said film when said meter is exposed to radiation.

12. A radiation meter of the class described comprising a film holder adapted to be carried on the person of individuals exposed to X-ray and gamma and beta type radiations, a film unit contained in said holder, said film unit comprising a plurality of superposed, co-extensive films which are sensitive to said types of radiation but which are of substantially differing sensitivities, said holder having a window therein permitting free passage of said types of radiation to one portion of said film unit, and a filter means arranged to filter the radiations reaching another portion of said film unit, said filter means being substantially impervious to beta type radiation, the response characteristics of said films to X-ray and gamma radiation and the absorption characteristics of said filter means to such radiation being so correlated that the response of said film for equal exposures in roentgen units is substantially independent of the quantum energy of the radiation in the energy range which it is desired to meter.

13. A radiation meter of the class described comprising a film holder adapted to be carried on the person of individuals exposed to X-ray and gamma and beta type radiations, a film unit contained in said holder, said film unit comprising a plurality of superposed, coextensive films which are sensitive to X-ray and gamma radiation but which are of substantially differing sensitivities, said holder having a window therein permitting free passage of said types of radiation to one portion of said film unit, and a filter means arranged to filter the radiations reaching another portion of said film unit, said filter means being substantially impervious to beta type radiation, the absorption characteristics of said filter means and the response characteristics of said films to X-ray and gamma radiation being so correlated that the response of said films for equal exposures in roentgen units is substantially independent of the quantum energy of the radiation in the energy range which it is desired to meter, a portion of said filter being pierced with apertures adapted to form an identification pattern on the underlying portion of said film when said meter is exposed to radiation.

14. A radiation meter of the class described comprising a film holder adapted to be carried on the person of individuals exposed to X-ray and gamma and beta type radiations, said holder comprising a pair of cooperating members assembled in interfitting relation so as to define the walls of a box-like closure, a film which is sensitive to said types of radiation contained in said holder, said holder having a window therein permitting free passage of said types of radiation to one portion of said film, and filter means comprising members of sheet metal affixed to said wall defining members so as to filter the radiation reaching another portion of said film, said filter means being substantially impervious to beta type radiation and the absorption characteristics of said filter with respect to X-ray and gamma radiation being so correlated with the sensitivity characteristics of said film that the response of said film for equal exposure in roentgen units is substantially independent of the quantum energy of the radiation in the energy range which it is to meter, said cooperating members being readily disassemblable to permit removal and replacement of said film unit.

15. A radiation meter as defined in claim 14 wherein the filter means comprises a sheet of metallic cadmium having a thickness of the order of about 1 to 2 millimeters.

16. A radiation meter as defined in claim 14 wherein the filter means comprises a sheet of metallic silver having thickness of the order of about 1 to 2 millimeters.

17. A radiation meter of the class described comprising a film holder adapted to be carried on the person of individuals exposed to X-ray and gamma and beta type radiations, said holder comprising a pair of cooperating, channel shaped members, generally rectangular in outline, assembled in interfitting relation so as to define the walls of a box-like film holder, said cooperating members having openings at one end thereof which align to define a window in said holder for free passage of both types of radiation to the portion of said film at that end of the holder, and filter means comprising members of sheet metal affixed to said wall defining members so as to shield other portions of said film, said filter means being substantially impervious to beta type radiation, the absorption characteristics of said filter to gamma radiation and the response characteristics of said film to gamma radiations being so correlated that the response of said film for equal exposures in roentgen units is substantially independent of the quantum energy of the radiation in the energy range which it is desired to meter, a portion of at least one of said filter members being provided with apertures for forming an identification pattern on the underlying portion of said film by radiation exposure therethrough.

18. A radiation meter of the class described comprising, in combination, a film holder and a film unit contained in said holder, said film unit comprising a plurality of separable films, each of which is sensitive to X-ray and gamma radiation, said films having substantially different sensitivities to such radiation.

19. A radiation meter of the class described comprising a box-like film holder, and a film unit contained in said holder, said film unit comprising a plurality of separable films which are sensitive to X-ray and gamma radiation, the sensitivities of said films being such that substantially maximum blackening of one film is attained with an exposure of the order of 3 roentgens, and maximum blackening of another of said films is attained with an exposure of the order of 20 roentgens.

20. The meter of claim 18 wherein said separable films are superimposed.

ERNEST O. WOLLAN.
LOUIS A. PARDUE.
NORMAN GOLDSTEIN.

REFERENCES CITED

The following references are of record in the file of this patent:

UNITED STATES PATENTS

| Number | Name | Date |
| --- | --- | --- |
| 456,396 | Blakemore | July 21, 1891 |
| 1,540,862 | Punnett | June 9, 1925 |
| 1,846,230 | Stuber | Feb. 23, 1932 |
| 1,912,464 | Powers | June 6, 1933 |
| 2,387,887 | Dimsdale | Oct. 30, 1945 |
| 2,399,650 | Moyer | May 7, 1946 |

OTHER REFERENCES

"Physical Review," vol. 54, Oct. 15, 1933, pp. 644 and 645.